United States Patent [19]
Onishi et al.

[11] Patent Number: 6,030,674
[45] Date of Patent: *Feb. 29, 2000

[54] CLEANING SHEET AND RECORDING MEDIUM SET INCLUDING THE SAME CLEANING SHEET

[75] Inventors: Hiroyuki Onishi; Akio Owatari; Junichi Iida, all of Nagano, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/611,843

[22] Filed: Mar. 8, 1996

[30] Foreign Application Priority Data

Mar. 10, 1995 [JP] Japan ................................. 7-079597
Mar. 5, 1996 [JP] Japan ................................. 8-075168

[51] Int. Cl.$^7$ ............................. B32B 7/12; B32B 7/14
[52] U.S. Cl. ..................... 428/40.1; 428/41.3; 428/41.5; 428/41.7; 428/340; 428/343; 428/355 RA; 428/355 AC; 428/500; 428/522; 428/199; 428/206; 15/256.51; 15/256.52; 399/327; 399/123
[58] Field of Search ................. 428/355 AC, 355 RA, 428/500, 510, 522, 352, 343, 340, 192, 195, 40.1, 41.3, 41.4, 41.5, 41.7; 399/123, 327; 15/256.51, 256.52

[56] References Cited

U.S. PATENT DOCUMENTS

| | | | |
|---|---|---|---|
| 4,684,558 | 8/1987 | Keusch et al. | 428/40 |
| 5,138,390 | 8/1992 | Miyabaysshi et al. | 355/283 |
| 5,223,329 | 6/1993 | Amann | 428/198 |
| 5,227,844 | 7/1993 | Bhattacharjee et al. | 355/215 |
| 5,318,825 | 6/1994 | Naber | 428/192 |
| 5,423,411 | 6/1995 | Kennett | 198/494 |
| 5,457,843 | 10/1995 | Gelardi et al. | 15/229.12 |
| 5,560,980 | 10/1996 | Sakaki et al. | 428/195 |
| 5,616,386 | 4/1997 | Okada et al. | 428/40.1 |
| 5,751,306 | 5/1998 | Sakaki et al. | 347/22 |

FOREIGN PATENT DOCUMENTS

| | | |
|---|---|---|
| 0531992 A2 | 3/1993 | European Pat. Off. . |
| 0531992 A3 | 3/1993 | European Pat. Off. . |
| 518835 | 3/1993 | Japan . |

OTHER PUBLICATIONS

Patent Abstract of Katsumi, et al., vol. 009, No. 028, Oct. 3, 1984.
Patent Abstract of Michio, et al., vol. 007, No. 180, May 17, 1983.
Patent Abstract of Taiichiro, et al., vol. 018, No. 689, Sep. 30, 1994.
"Pressure Sensitive Adhesives", Encyclopedia of Polymer Science and Engineering, vol. 13, pp. 352–357, 1985.

*Primary Examiner*—Paul Thibodeau
*Assistant Examiner*—D. Lawrence Tarazano
*Attorney, Agent, or Firm*—Sughrue, Mion, Zinn, Macpeak & Seas, PLLC

[57] ABSTRACT

A cleaning sheet comprises a sheet-shaped base and an adhesive layer formed on at least one surface of the sheet-shaped base member. The adhesive layer has an adhesive strength in the range of 0.1–0.5 gf 125 mm according to a 180-degree peel-off method provided by JIS Z-0237. Or the adhesive layer has a tackiness degree in the range of 1–5 according to a J DOW method provided by JIS Z-0237.

15 Claims, 4 Drawing Sheets

CLEANING SHEET AND RECORDING MEDIUM SET INCLUDING THE SAME CLEANING SHEET

BACKGROUND OF THE INVENTION

1. Field of the Invention

The present invention relates to a cleaning sheet and a recording medium set including the cleaning sheet.

As known well, in an image forming apparatus such as a printer, a facsimile or the like, a sheet-shaped recording medium supplied thereto is delivered by use of delivery means, images are formed on the recording medium, and the recording medium with the images formed thereon is then discharged therefrom. When images are formed on a number of recording mediums larger than a preset number of recording mediums, the delivery performance of the delivery means for delivering the recording mediums may be degraded. That is, more particularly, the present invention relates to a cleaning sheet, which is supplied to the image forming apparatus in place of the above-mentioned recording medium, and a recording medium set including the cleaning sheet to recover the degraded delivery performance upon the aforementioned situation.

2. Description of the Prior Art Generally, there is widely known an image forming apparatus such as a printer, a facsimile, or the like which is arranged to deliver a sheet-shaped recording medium supplied thereto by use of delivery means, to form images on the recording medium and then to discharge the recording medium with the images formed thereon.

The image forming apparatus of this type, normally, includes a feed roller for feeding a recording medium into the apparatus, delivery means such as a delivery roller, a delivery belt or the like for delivering the recording medium fed by the feed roller, and a discharge roller for discharging out the recording medium with the image formed thereon externally of the apparatus.

On the other hand, as the recording medium, there are known various kinds of things such as ordinary paper, coated paper, OHP (overhead projector) sheet, calendered paper, bright film and the like.

In the above-mentioned image forming apparatus, if images are formed in a larger number of recording mediums than a preset number of recording mediums, then paper powder or the like is adhered in large quantity to the feed roller, delivery means such as the delivery roller or the like, and discharge roller. This reduces the frictional force of these rollers with respect to the recording medium which, in turn, results in the degraded delivery performance of these rollers for delivering the recording medium, That is, if the delivery performance of the feed roller is degraded, then there occurs the poor feeding of the recording medium, poor head search of the recording medium and the like; if the delivery performance of the delivery roller is degraded, then there occurs the poor head search, delivery pitch shifting and the like; and, if the delivery performance of the discharge roller is degraded, then there occur the delivery pitch shifting, poor discharge of the recording medium and the like.

Especially, when the coated paper or the like (such as coated paper, OHP sheet, calendered paper, bright film, or the like; this way of expression will be used hereinafter) is used as the recording medium, the delivery performance of the delivery means of the image informing apparatus is degraded after only a relatively small number of sheets is printed. Since the surface of the coated paper is flat when compared with the surface of the ordinary paper, if two or more sheets of coated paper are superimposed on top of each other, they easily adhere to each other. On the other hand, most of the image is forming apparatuses include a paper feed tray which is used to hold a large number of recording mediums to be fed by the feed roller in such a manner that they are superimposed one on top of another. That is, if a large number of sheets of coated paper are set in a superimposed manner in the paper feed tray, then there is a fear that there can occur a multiple feeding (two or more sheets of recording medium can be fed together). Therefore, generally, a gap agent (for example, particles of the order of $10\mu$)) is mixed into a coated layer of the coated paper in order to prevent this coated paper from adhering to the coated paper that is just superimposed on top of this coated paper. Alternatively a lubricant is coated on the back surface of the coated paper in order to enhance the slidability of the coated paper with respect to the coated paper that is superimposed on bottom of this coated paper.

The above-mentioned gap agent or lubricant, in a process in which the coated paper or the like is delivered, is peeled off from the coated paper or the like and adheres to the rollers and the like of the image forming apparatus, so that the delivery performance of the rollers and the like for delivering the recording medium is lowered greatly when compared with the paper powder.

That is, when the coated paper or the like is used as the recording medium, the delivery performance of the delivery rollers and the like is degraded with a relatively small number of recording mediums delivered.

As means for solving the above-mentioned problems, conventionally, there is known a cleaning sheet which is disclosed in Japanese Utility Model Pulication No. Hei. 5-18835.

As shown in FIG. 9, in the cleaning sheet S, at least on one surface of the upper and lower surfaces of a sheet member 1, there is (are) formed an adhesive layer (adhesive layers) 2 and the surface(s) of the adhesive layer(s) 2 is (are) covered with a fiber layer (layers) 3 (for example, unwoven cloth layer).

According to this cleaning sheet, when the recording medium delivery performance of the image forming apparatus is degraded, if the cleaning sheet is supplied instead of the recording medium, then the paper powder, gap agent, lubricant and the like stuck to the delivery means of the image forming apparatus are adsorbed to the adhesive layer(s) 2 through the fiber layer(s) 3, which makes it possible to recover the degraded delivery performance of the image forming apparatus.

However, in the above-mentioned conventional cleaning sheet, since the surface of the adhesive layer 2 is covered with the fiber layer 3, when the present cleaning sheet is supplied to the image forming apparatus instead of the recording medium, there is a fear that the fiber per se which forms the fiber layer 3 can adhere to the delivery means of the image forming apparatus, so that the delivery performance of the image forming apparatus cannot be always recovered effectively.

Also, in the above-mentioned conventional cleaning sheet, because the adhesive layer 2 formed of a tacky agent is provided on the whole of at least one surface of the sheet member 1, in an image forming apparatus of a type including a feed roller which is contactable with the upper surface of a recording medium to supply the recording medium by means of its frictional force produced with respect to the recording medium, if the cleaning sheet is set in such a manner that the adhesive layer 2 and paper feed tray are opposed to each other, then there is a fear that a frictional force between the cleaning sheet and paper feed tray while the feed roller is in operation can increase to thereby fail to supply the cleaning sheet.

SUMMARY OF THE INVENTION

In view of the above, it is a first object of the invention to provide a cleaning sheet which can solve the problems found in the above-mentioned conventional cleaning sheet and also which, when the delivery performance of an image forming apparatus for delivering a recording medium is degraded, is able to recover the degraded delivery performance effectively.

Also, it is a second object of the invention to provide a cleaning sheet which can be supplied positively into an image forming apparatus even if the image forming apparatus is of a type that it includes a feed roller which can touch the upper surface of a recording medium set in a paper feed tray to supply the recording medium by means of its frictional force produced with respect to the recording medium. Further, it is a third object of the invention to provide a recording medium set which can prevent the delivery performance of an image forming apparatus for delivering a recording medium from being degraded.

As viewed from a first aspect of the invention, there is provided a cleaning sheet comprising: a sheet-shaped base; and an adhesive layer formed on at least one surface of the sheet-shaped base member, the adhesive layer has an adhesive strength in the range of 0.1–0.5 gf according to a 180-degree peel-off method provided by JIS Z-0237.

As viewed from a second aspect of the invention, there is provided a cleaning sheet comprising: a sheet-shaped base; and an adhesive layer formed on at least one surface of the sheet-shaped base member, the adhesive layer has a tackiness degree in the range of 1–5 according to a J DOW method provided by JIS Z-0237.

The J DOW method is well known, and is used to measure how tacky an adhesive is. This method involves rolling balls on an inclined surface over an adhesive. In the particular J DOW method provided by JIS Z-0237, a hard surface is inclined at an angle of 30°. An adhesive sheet 10 cm long is fixed, adhesive layer up, on the inclined surface. A set of steel balls is provided. The steel balls have respective diameters varying from 1/32 inch to 1 inch, and are numbered in increasing order of size. The number of the ball is the diameter of the ball times 32. The 1 inch diameter ball is thus ball number 32, a 1/16 inch diameter ball is ball number 2, a 5/32 inch diameter ball is ball number 5, and so on. Each ball of the set of steel balls is successively rolled on the inclined surface, with an initial speed of 0. The start point for allowing the ball to roll is set so as always to be 10 cm from the adhesive layer, thus giving an approach distance of 10 cm before contacting the adhesive. The tackiness of the adhesive tape is expressed by the ball number of the biggest of the balls that stops on the adhesive layer.

As viewed from a third aspect of the invention, there is provided a cleaning sheet to be used for an image forming apparatus comprising a feed roller which contacts with a recording medium to supply the recording medium by the frictional force between the feed roller and the recording medium, the cleaning sheet is supplied to the image forming apparatus instead of the recording medium and comprises; a sheet-shaped base having a lower surface and an upper surface; and an adhesive layer formed on at least one surface of the sheet-shaped base member; wherein the adhesive layer is not formed in the portion opposed to the portion of one of the lower and upper surfaces of the sheet-shaped base that contacts with the feed roller.

As viewed from a fourth aspect of the invention, the adhesive layer has an adhesive strength in the range of 0.1–0.5 gf according to a 180-degree peel-off method provided by JIS Z-0237 in the third aspect of the invention.

As viewed from a fifth aspect of the invention, the adhesive layer has a tackiness degree in the range of 1–5 according to a J DOW method provided by JIS Z-0237 in the third aspect of the invention.

As viewed from a sixth aspect of the invention, the adhesive layer is formed in both surfaces of the sheet-shaped base member in the first aspect of the invention.

As viewed from a seventh aspect of the invention, the cleaning sheet further includes a protection sheet for covering the surface of the adhesive layer when the cleaning sheet is not in use in the first aspect of the invention.

As viewed from an eighth aspect of the invention, there is provided a recording medium set to be used for an image forming apparatus in which a recording medium of the recording medum set is delivered by delivery means of the image forming apparatus, the delivery performance of the image forming apparatus for delivering the recording medium being degraded when images are formed on a preset number of recording mediums, which comprises: a cleaning sheet including a sheet-shaped base and an adhesive layer formed on at least one surface of the sheet-shaped base member and; a plurality of recording mediums; wherein the number of recording mediums is smaller than the preset number of recording mediums.

The cleaning sheet as viewed from the first aspect of the invention is supplied into the image forming apparatus instead of a recording medium.

The cleaning sheet supplied, similarly to the recording member, is delivered by delivery means and is then discharged externally of the image forming apparatus.

Therefore, the cleaning sheet touches the delivery means provided within the image forming apparatus in a process in which the cleaning sheet is supplied into the image forming apparatus, is delivered within the image forming apparatus, and is discharged out of the image forming apparatus.

With use of the present cleaning sheet, since the adhesive layer is formed on at least one surface of the sheet-shaped base member of the cleaning sheet, if the present cleaning sheet is supplied in such a manner that the adhesive layer thereof touches the delivery means, then paper powder, gap agent, lubricant and the like stuck to the delivery means can be adsorbed to the adhesive layer.

And, since the adhesive strength of the above adhesive layer is 0.1–0.5 gf when it is measured according to the 180-degree peel-off method provided by JIS Z-0237, the paper powder, gap agent, lubricant and the like stuck to the delivery means of the image forming apparatus can be adsorbed to the adhesive layer smoothly and effectively.

That is, if the adhesive strength of the adhesive layer of the cleaning sheet is more than 0.5 gf, then the cleaning sheet adheres to the delivery means itself too much so that the cleaning sheet cannot be delivered smoothly. Or, if the adhesive strength is less than 0.1, then the adhesive strength of the adhesive layer with respect to the paper powder, gap agent, lubricant, and the like stuck to the delivery means is too weak.

On the other hand, since the adhesive strength of the adhesive layer thereof is in the above-mentioned range of 0.1–0.5 gf, the paper powder, gap agent, lubricant and the like stuck to the delivery means can be adsorbed to the adhesive layer smoothly and effectively.

Therefore, when the delivery performance of the image forming apparatus for delivering the recording medium is degraded, by supplying the present cleaning sheet instead of the recording medium, the degraded delivery performance can be recovered smoothly and effectively.

Also, the cleaning sheet as viewed from the second aspect of the invention is supplied to an image forming apparatus instead of the recording medium.

The cleaning sheet supplied, similarly to the recording medium, is then delivered by delivery means within the image forming apparatus and is discharged by the delivery means externally of the image forming apparatus, Therefore, the cleaning sheet touches the delivery means provided in the image forming apparatus in a process in which the cleaning sheet is supplied into the image forming apparatus, is delivered through the image forming apparatus and is discharged externally of the image forming apparatus.

According to the present cleaning sheet, since the adhesive layer is formed on at least one surface of the sheet-shaped base member of the cleaning sheet, by supplying the cleaning sheet in such a manner that the adhesive layer can touch the delivery means, the paper powder, gap agent, lubricant and the like stuck to the delivery means can be adsorbed to the adhesive layer.

And, since the tackiness degree of the adhesive layer is 1–5 when it is measured according to the J DOW method provided by JIS Z-0237, the paper powder, gap agent, lubricant and the like stuck to the delivery means can be adsorbed to the adhesive layer smoothly and effectively.

That is, if the tackiness degree of the adhesive layer is more than 5, then the cleaning sheet adheres to the delivery means itself too excessively so that the cleaning sheet cannot be delivered smoothly; or, if the tackiness degree is less than 1, then the adhesive strength of the adhesive layer is too weak with respect to the paper powder, gap agent, lubricant and the like stuck to the delivery means.

On the other hand, since the tackiness degree of the adhesive layer is in the above-mentioned range of 1–5, the paper powder, gap agent, lubricant and the like stuck to the delivery means can be adsorbed to the adhesive layer smoothly and effectively.

Therefore, when the delivery performance of the image forming apparatus for delivering the recording medium is degraded, by supplying the present cleaning sheet instead of the recording medium, the degraded delivery performance can be recovered smoothly and effectively.

As viewed from the third aspect of the invention, there is provided a cleaning sheet which is especially effective when it is used in an image forming apparatus of a type that it includes a paper feed tray in which a recording medium is set, and a feed roller which touches the upper surface of the recording medium set in the paper feed tray and supplies the recording medium with its frictional force with respect to the recording medium.

The cleaning sheet includes a sheet-shaped base member and an adhesive layer formed on at least one surface of the sheet-shaped base member, while the adhesive layer is formed in the other portion of the lower surface of the base member than the portion of the lower surface of the base member opposed to the contact portion of the upper portion of the base member that is contacted with the feed roller when the cleaning sheet is set in the paper feed tray instead of the recording medium. Thanks to this, the present cleaning sheet can be supplied into the image forming apparatus positively.

Generally, in an image forming apparatus of a type including a feed roller which touches the upper surface of a recording medium set in a paper feed tray and supplies the recording medium by means of a frictional force produced between them, if the adhesive layer of a cleaning sheet is formed on the portion of the lower surface of the cleaning sheet opposed to the portion of the upper surface thereof that is touchable with the feed roller, then the frictional force produced between the cleaning sheet and paper feed tray while the feed roller is in operation becomes large, which raises a fear that the cleaning sheet cannot be supplied.

On the other hand, when the present cleaning sheet is set in the paper feed tray instead of the recording medium, since the adhesive layer of the cleaning sheet is not formed in the portion of the lower surface thereof opposed to the portion of the upper surface thereof that is touchable with the feed roller, the frictional force produced between the cleaning sheet and paper feed tray while the feed roller is in operation is reduced, which makes it possible to supply the cleaning sheet positively.

Further, as viewed from the fourth aspect of the invention, in the cleaning sheet as viewd from the third aspect, the adhesive layer has an adhesive strength of 0.1–0.5 gf when it is measured according to the 180-degree peel-off method provided by JIS Z-0237. Thanks to this, even if an image forming apparatus is an apparatus of a type including a feed roller which can touch the upper surface of a recording medium set in a paper feed tray to supply the recording medium by means of its frictional force with respect to the recording medium, the present cleaning sheet can be supplied positively and, at the same time, paper powder, a gap agent, a lubricant and the like adhering to the delivery means of the apparatus can be adsorbed to the adhesive layer of the cleaning sheet.

Further, as viewed from the fifth aspect of the invention, in the cleaning sheet as viewed from the third aspect, the adhesive layer has a tackiness degree of 1–5 when it is measured according to the J DOW method provided by JIS Z-0237. Thanks to this, even if an image forming apparatus is an apparatus of a type including a feed roller which touches the upper surface of a recording medium set in a paper feed tray and supplies the recording medium by means of its frictional force produced with respect to the recording medium, the present cleaning sheet can be supplied positively and, at the same time, paper powder, a gap agent, a lubricant and the like adhering to the delivery means of the apparatus can be adsorbed to the adhesive layer of the cleaning sheet.

According to the cleaning sheet as viewed from the sixth aspect of the invention, since an adhesive layer is formed on either surface of the sheet-shaped base member of the cleaning sheet, when the present cleaning sheet is supplied into an image forming apparatus, then the adhesive layer can always touch the delivery means of the image forming apparatus. That is, the present cleaning sheet can be used without worrying about the front and back surfaces of the cleaning sheet to be supplied.

Also, when the image forming apparatus includes delivery means contactable with the front surface of the recording medium as well as delivery means contactable with the back surface thereof, with use of the present cleaning sheet, the performance of the two delivery means can be recovered at the same time.

According to the invention as viewed from the seventh aspect, the aforementioned cleaning sheets include a protection sheet for covering the adhesive layer when the cleaning sheet is not in use. Due to this, the present cleaning sheet can prevent the surface of the adhesive layer from being contaminated with dust or the like and thus can prevent the adhesive strength of the adhesive layer from being impaired.

That is, the present cleaning sheet is arranged such that it can be reused.

Moreover, according to the invention as viewed from the eighth aspect, there is provided a recording medium set, in which the recording medium set includes a smaller number of recording mediums than a preset number of recording mediums that causes the delivery performance of the image forming apparatus for delivering the recording medium to be degraded when images are formed in the preset number of recording mediums, and the aforementioned cleaning sheets. Thanks to this, there can be obtained the following actions.

That is, at a time when a user, who has obtained the present recording medium set, uses up the recording medium sheets of the recording medium set, the delivery performance of the image forming apparatus for delivering the recording medium is not yet degraded.

On the other hand, when the recording medium is used up, then there is left the cleaning sheet and thus it is easy for the user to use the present cleaning sheet. In other words, at a time when the recording medium sheets of the recording medium set is used, it can be expected sufficiently that the user is aware of the cleaning sheet and uses it.

Therefore, according to the recording medium set, it is possible to prevent the delivery performance of the image forming apparatus for delivering the recording medium from being degraded (at least, this can be expected sufficiently).

DETAILED DESCRIPTION OF THE PREFERRED EMBODIMENTS

Now, description will be given below of the embodiments according the present invention with reference to the accompanying drawings.

1st Embodiment

Figure 1:
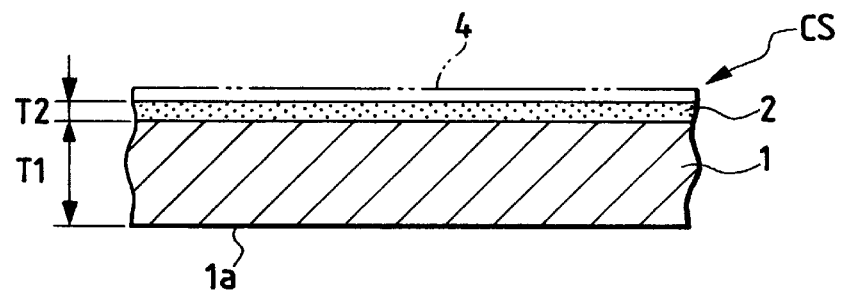
FIG. 1 is a partially sectional typical view of a first embodiment of a cleaning sheet according to the invention.

FIG. 1 is a partially sectional typical view of a first embodiment of a cleaning sheet according to the invention.

As shown in FIG. 1, a cleaning sheet CS includes a sheet-shaped base member 1 and an adhesive layer 2 formed on one surface of the sheet-shaped base member 1.

The sheet-shaped base member 1 is formed of a synthetic resin sheet such as a PET (polyethylene telephtalate) sheet, a white PET sheet, or the like. The thickness T1 of the sheet-shaped base member 1 is preferably in the range of 50–200 $\mu$m. Also, paper can also be used as the sheet-shaped base member 1.

The adhesive layer 2 is formed by coating an adhesive onto the sheet-shaped base member 1. The thickness T2 of the adhesive layer 2 is in the range of 1–30 $\mu$m, while the adhesive strength of the adhesive layer 2 is set in the following range.

That is when measured according to a 180-degree peel-off method provided by JIS Z-0237, the adhesive strength of the adhesive layer 2 is in the range of 0.1–0.5 gf.

Or, when measured according to a J DOW method provided by JIS Z-0237, the tackiness degree of the adhesive layer 2 is in the range of 1–5.

The adhesive to be used in the present application is composed mainly of a water-soluble polymeric material including synthetic and semisynthetic polymeric materials and naturally ocurring polymeric materials (e.g., one of polyvinyl alcohol, polyvinylpyrrolidone, carboxymethyl cellulose, oxidized starch, polyacrylate, polymethacrylate, etherified starch, gelatin and its derivative, hydroxyethyl cellulose, albumin, starch, silicone rubber and the like). Any of these materials may be used in either singly or a combination of two or more of them.

Also, the adhesive can also be composed of a copolymer comprising mainly a main monomer component having low Tg to exhibit adhesiveness, a comonomer component having a high Tg and a functional group-containing monomer component.

Examples of the main monomer component include alkyl acrylates such as ethyl acrylate, butyl acrylate, amyl acrylate 2-ethylhexyl acrylate, octyl acrylate, cyclohexyl acrylate, benzyl acrylate or the like; and, alkyl methacrylates such as butyl methacrylate, 2-ethylhexyl methacrylate, cylcohexyl methacrylate, benzyl methacrylate or the like.

Examples of the comonomer component include methyl acrylate, methyl methacrylate, ethyl mothacrylate, vinyl acetate, styrene, acrylonitrile and the like.

Examples of the functional group-containing monomer component include a carboxyl group-containing monomers such as acrylic acid, methacrylic acid, maleic acid, itaconic acid, crotonic acid, or the like; a hydroxyl group-containing monomers such as 2-hydroxyethyl (meth)acrylate, 2-hydroxypropyl (meth)acrylate, N-methylol acrylamide or the like; acrylamide; methacrylamide; glycidyl methacrylate; and the like.

If a crosslinking agent is added to a solution of one of these polymers or copolymers, then the adhesive strength or tackiness degree of the adhesive can be adjusted to the above-mentioned range.

Examples of the crosslinking agent which may be selected include a crosslinking agent of a type that can react with a functional group such as an isocyanate group, an epoxy group, ethylenimine group, an aluminum chelate group or the like.

The quantity of coating (dry weight) of the adhesive may be in the range of 5–50 g/m$^2$, preferably, in the range of 10–30 g/m$^2$. If the quantity of coating of the adhesive is in the range of 10–30 g/m$^2$, then the cleaning effect and paper permeability of the tackiness layer can be balanced well.

When the cleaning sheet CS is not in use, the surface of the adhesive layer 2 is covered with the protection sheet 4.

The protection sheet 4 can be formed of thin paper, thin film or the like. For example, the protection sheet 4 can be produced by coating silicone onto the paper in the range of 0.1–3 g/m², while the quantity of coating depends on the kind of the paper, that is, the quantity is determined according to whether the paper is free sheet or glassine. Or, the protection sheet 4 can be produced by coating a release agent such as silicone onto a polyester film or a polypropylene film.

When the worst condition is assumed, for example, when it is assumed that the cleaning sheet CS and protection sheet 4 are in pressure contact with each other for a long time for some reason or other, as the material of the protection sheet 4, it is desirable to use such material that the adhesive force thereof with the adhesive layer 2 is smaller than an adhesive force between the adhesive layer 2 and sheet-shaped base member 1. Now, FIG. 5 is a side view of the internal structure of an ink jet printer which is an example of an image forming apparatus.

Figure 5:
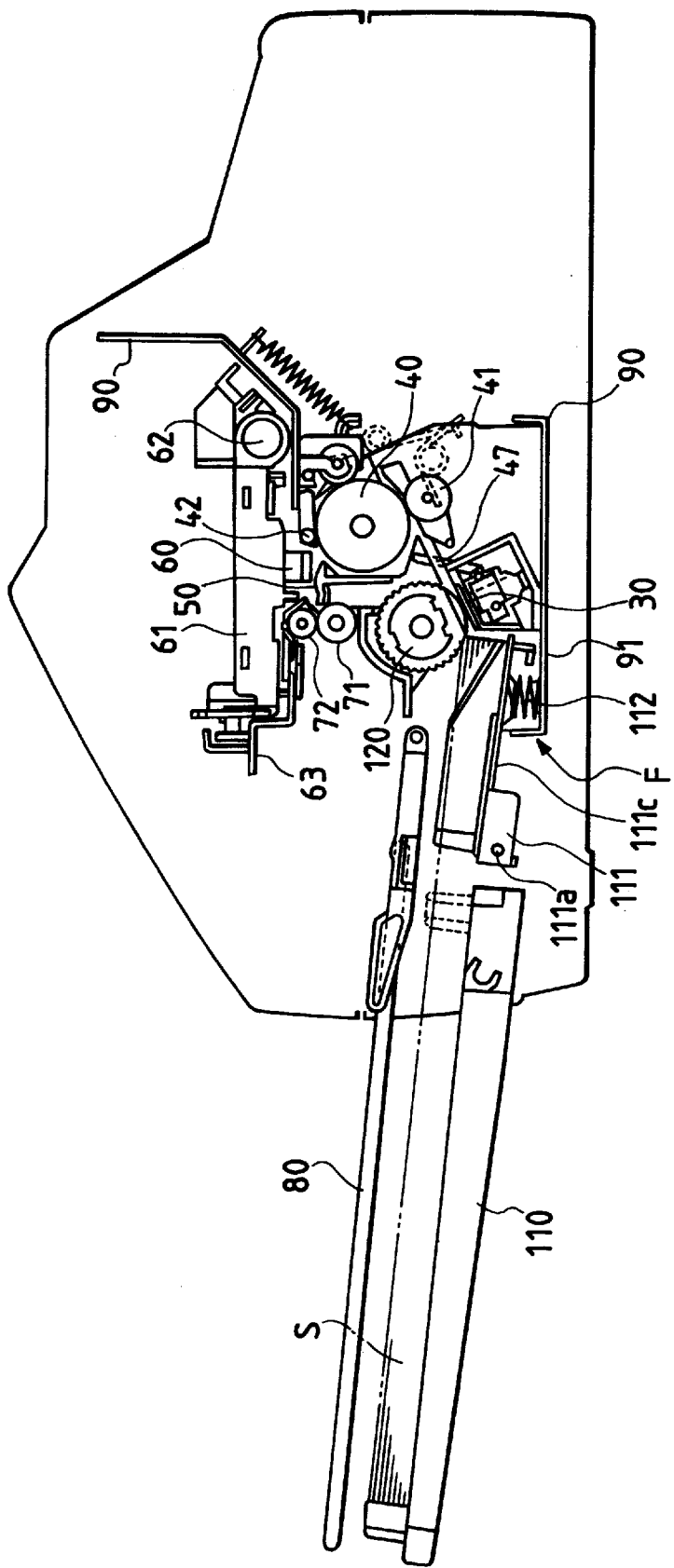
FIG. 5 is a side view of the internal structure of an ink jet printer employed in the invention as an image forming apparatus.

In FIG. 5, reference character F designates a paper feed device which includes a paper feed tray 110 and a feed roller 120. The paper feed tray 110 is able to hold a plurality of sheet-shaped recording mediums 5 which are superimposed on top of one another and, in the front portion of the paper feed tray 110, there is provided a paper feed hopper 111. The paper feed hopper 111 is mounted in such a manner that it can be swung about a shaft 111a with respect to the side plate of a frame 90. Between the bottom plate 111c of the paper feed hopper 111 and the bottom plate 91 of the frame 90, there is provided a spring 112 by means of which the paper feed hopper 111 forces the front portion of the recording medium S to be applied on the feed roller 120. The feed roller 120 is formed in a D shape when it is viewed from the side surface thereof and at least the circumferential surface of the feed roller 120 is formed of rubber having a relatively large friction coefficient.

Referring to the paper feed device F, if a printer is actuated, then the feed roller 120 is rotated once to thereby feed the recording medium S one by one.

The thus fed recording medium S, after the leading end of the recording medium S is contacted between a gate roller 41 and a delivery roller 40 and the skew of the recording medium S is thereby removed, is wound around the delivery roller 40 and is rotated reversely, and, with the angle of feeding thereof regulated by a pinch roller 42, the recording medium S is sent out of the delivery roller. The thus sent recording medium S is guided while it contacts with the upper surface of a regulation member 50 and thus the distance between an ink jet head 60 and itself is regulated by the regulation member 50, while ink is jetted out from the head 60 onto the surface of the recording medium S and the recording medium S is printed (that is, images are formed on the surface of the recording medium). The printed recording medium S is moved through a pair of discharge rollers 71, 72 and are discharged onto a paper discharge tray 80.

The delivery roller 40 comprises a rubber roller which is formed in a round rod, the gate roller 41 comprises a synthetic resin roller, the pinch roller 42 comprises a metal roller, one discharge roller 71 comprises a rubber roller, and another discharge roller 72 comprises a corrugated roller (a thin-plate-shaped star wheel).

The ink jet head 60 is a head which is able to execute color print by ejecting out a plurality of color inks, and the head 60 is mounted on a carriage 61. The carriage 61 is guided by a guide shaft 62 and a guide rail 63 and is reciprocated in a direction extending at right angles to the surface of FIG. 5 when it is driven by a carriage motor (not shown). Onto the carriage 61, there are mounted an ink tank for monochrome and an ink tank for color (neither of which are shown) at the same time.

In the above-mentioned ink jet printer, when images are formed on a larger number of recording mediums S than a preset number of recording mediums, then a large quantity of paper powder and the like stick to the feed roller 120, delivery roller 40 and discharge roller 71 to thereby reduce the frictional forces between the rollers and recording medium S, so that the performance of the rollers for delivering the recording medium S is degraded. In particular, when the delivery performance of the feed roller 120 is degraded, then there occurs the poor feeding of the recording medium or, after the skew of the recording medium is removed, the head or beginning portion of the recording medium cannot be searched smoothly; when the delivery performance of the delivery roller 40 is degraded, then the above-mentioned difficulty in searching the beginning portion of the recording medium arises or the delivery pitch of the roller is caused to shift from the normal pitch thereof; and, when the delivery performance of the discharge roller 71 is degraded, then there occur the shifted delivery pitch and the poor discharge of the recording medium.

Especially, in order to enhance the quality of images to be formed, when coated paper or the like (such as coated paper, OHP sheet, calendered paper, bright film and the like) is used as the recording medium S, then a gap agent mixed into the coating layer of the coated paper or lubricant coated on the back surface of the coated paper is caused to come off from the coated paper in a process in which the coated paper or the like is delivered, so that the gap agent or lubricant adheres to the above-mentioned rollers 120, 40, and 71.

For this reason, when the coated paper or the like is used as the recording medium S, the delivery performance of the ink jet printer is degraded with a relatively small number of prints or coated paper. For example, when images are formed on about 7000 sheets of coated paper, at the then time there occurs a non-feed condition, that is, a condition that the recording medium cannot be fed by the feed roller 120 any longer.

When the above-mentioned degraded delivery performance occurs, the cleaning sheet CS according to the present embodiment may be used in the following manner.

After the protection sheet 4 is peeled off, the cleaning sheet CS is set on the paper feed tray 110 and the printer is allowed to perform only the paper feeding operation, paper delivering operation and paper discharging operation. That is, only the paper moving operations exclusive of the printing operation are carried out. The present printer includes such operation mode.

In view of the above, the cleaning sheet CS is supplied into the printer instead of the recording medium S.

The thus supplied cleaning sheet CS, similarly to the recording medium S, is delivered by the delivery roller 40 and is then discharged by the discharge rollers 71 and 72.

Therefore, the cleaning sheet CS touches the feed roller 120, delivery roller 40 and discharge roller 71 in a process where it is supplied, delivered and discharged.

In the cleaning sheet CS, the adhesive layer 2 is formed on one surface of the sheet-shaped base member 1. Thus, if the cleaning sheet CS is set in the paper feed tray 110 and is then supplied into the printer in such a manner that the adhesive layer 2 can touch the above respective rollers, that is, the adhesive layer 2 faces up, then the paper powder, gap agent, lubricant and the like adhering to the rollers can be adsorbed to the adhesive layer 2.

In other words, when the delivery performance of the printer for delivering the recording medium S is degraded, by supplying the cleaning sheet CS instead of the recording medium S, the degraded delivery performance of the printer can be recovered, Also, since the adhesive strength of the adhesive layer 2 is in the range of 0.1–0.5 gf according to the 180-degree peel-off method provided by JIS Z-0237, or the tackiness degree of the adhesive layer 2 is in the range of 1–5 according to the J DOW method provided by JIS Z-0237, the paper powder, gap agent, lubricant and the like adhering to the above rollers can be adsorbed to the adhesive layer 2 smoothly and effectively.

That is, if the adhesive strength of the adhesive layer 2 is more than 0.5 gf, or if the tackiness degree thereof is more than 5, then the cleaning sheet CS adheres to the rollers too much so that the cleaning sheet cannot be delivered smoothly. And if the adhesive strength of the adhesive layer 2 is less than 0.1 gf, or if the tackiness degree thereof is less than 1, then the soaking force of the adhesive layer 2 with respect to the paper powder, gap agent, lubricant and the like is weakened.

On the other hand, with use of the cleaning sheet CS according to the present embodiment, since the adhesive strength of the adhesive layer 2 of the cleaning sheet CS is in the range of 0,1–0.5 gf, or the tackiness degree thereof is in the range of 1–5, then the paper powder, gap agent, lubricant and the like adhering to the above rollers can be adsorbed to the adhesive layer 2.

Here, if an image forming layer (when the cleaning sheet CS is used in the above-mentioned ink jet printer, an ink receiving layer) is formed on the other surface 1a of the sheet-shaped base member 1, then the above-mentioned cleaning operation can also be carried out while forming images on the image forming layer.

2nd Embodiment

Figure 2:
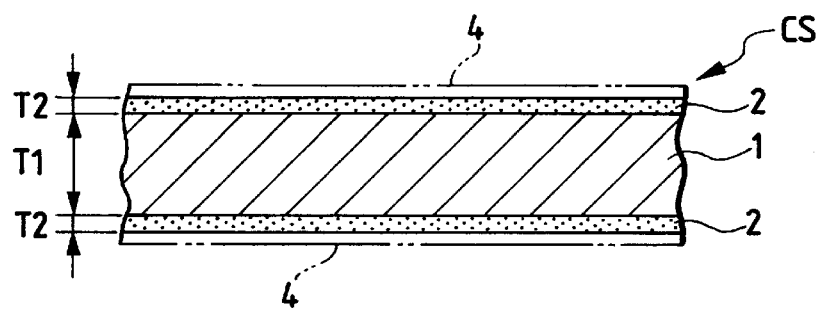
FIG. 2 is a partially sectional typical view of a second embodiment of a cleaning sheet according to the invention.

Now, FIG. 2 is a partially sectional schematic view of a second embodiment of a cleaning sheet according to the invention.

The present cleaning sheet is different from the cleaning sheet according to the above-mentioned first embodiment in that two adhesive layers 2 are formed respectively on both surfaces of the sheet-shaped base member 1, while the remaining portions of the second embodiment are similar to those of the first embodiment.

According to the present cleaning sheet, since the two adhesive layers 2 are formed respectively on either surface of the sheet-shaped base member 1, if the present cleaning sheet is supplied to the above-mentioned printer, the adhesive layers 2 are always able to touch the above-mentioned rollers. Thanks to this, the cleaning sheet can be used without worrying about the front and back sides of the cleaning sheet when it is supplied. Also, when the image forming apparatus includes not only delivery means to be in contact with the surface of a recording medium but also delivery means to be in contact with the back surface of the recording medium, with use of the cleaning sheet according to the second embodiment, the performance of these two delivery means can be recovered at the same time. For example, some image forming apparatuses have one or more of feed roller, a delivery roller, and a discharge roller that are composed of a pair of rubber rollers, or a pair of rubber belts, or a combination of a rubber belt and a rubber roller. To recover the degraded delivery performance of such image forming apparatus, in the cleaning sheet according to the previously described first embodiment, the cleaning sheet must be moved through the image forming apparatus at least two times; that is, in one time, it must be moved through with the front surface thereof facing up and, in the other time, it must be moved through with the back surface thereof facing up. On the other hand, in the cleaning sheet according to the second embodiment, by moving the cleaning sheet through the image forming apparatus only once, the degraded delivery performance of the above-mentioned pair of rubber rollers and the like can be recovered at the same time.

3rd Embodiment

Figure 3:
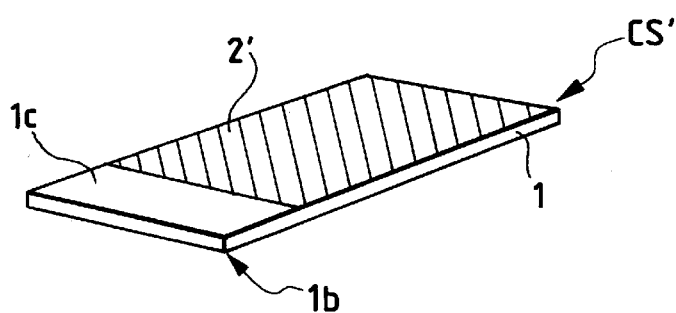
FIG. 3 is a shematic perspective view of a third embodiment of a cleaning sheet according to the invention.

Now, FIG. 3 is a shematic perspective view of a third embodiment of a cleaning sheet according to the invention. In FIG. 3, the cleaning sheet is shown upside down.

The cleaning sheet CS' according to the third embodiment is different from the cleaning sheet according to the first embodiment in that, when the cleaning sheet CS' is set in the paper feed tray instead of a recording medium, the adhesive layer 2' of the cleaning sheet CS' is formed in the other portion of the lower surface of the cleaning sheet CS' than the portion 1c thereof opposed to the portion 1b of the upper surface of the cleaning sheet CS, in contact with the feed roller, while the remaining portions of the third embodiment are similar to the first embodiment.

Figure 6:
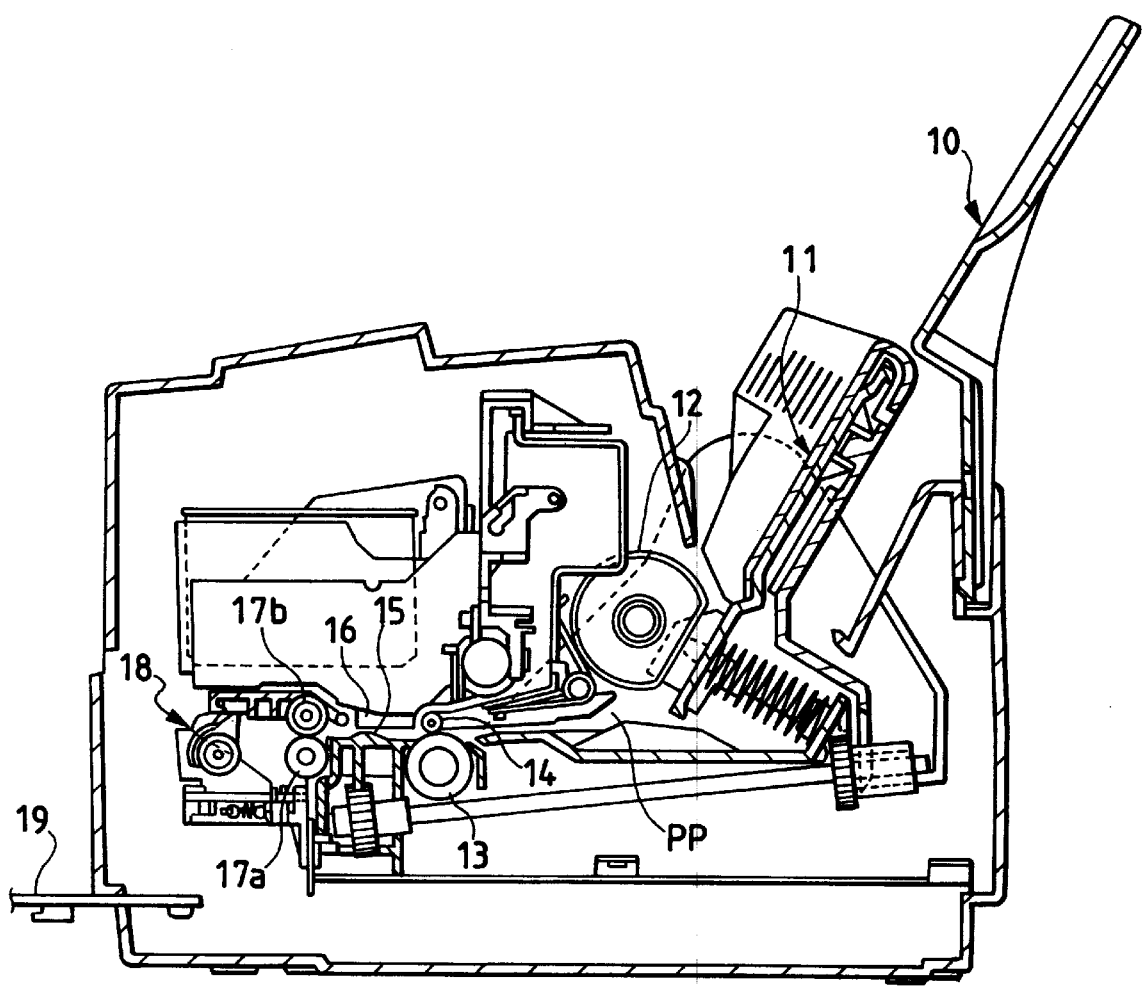
FIG. 6 is a side view of the internal structure of an ink jet printer of a different type from that shown in FIG. 5 employed in the invention as an image forming apparatus.

Now, FIG. 6 is a side view of the internal structure of an ink jet printer of a different type from the ink jet printer shown in FIG. 5.

In the printer shown in FIG. 6, a recording medium to be supplied is set on the paper feed tray 10 and hopper 11.

When supplying the recording medium, the hopper 11 pushes the recording medium toward a feed roller 12, while the rotating feed roller 12 touches the upper surface of the recording medium and supplies the recording medium due to its frictional force produced between the recording medium and itself.

The thus supplied recording medium is moved through a passage PP to arrive at a delivery roller 13 formed of a rubber roller and, with the angle of feeding thereof regulated by a metal pinch roller 14, the recording medium is sent out from the delivery roller 13. After the recording medium is sent out in this manner, while the lower surface of the recording medium is guided by a regulation member 15, a plurality of color inks are jetted out from a head 16 onto the surface (upper surface) of the recording medium and images are thus printed thereon. After then, the recording medium with the images printed thereon is moved through a pair of paper discharge rollers 17a, 17b and a discharge portion 18 and is then discharged onto the paper discharge tray 19. The paper discharge roller 17a comprises a rubber roller, while the paper discharge roller 17b comprises a metal corrugated roller.

Figure 7:
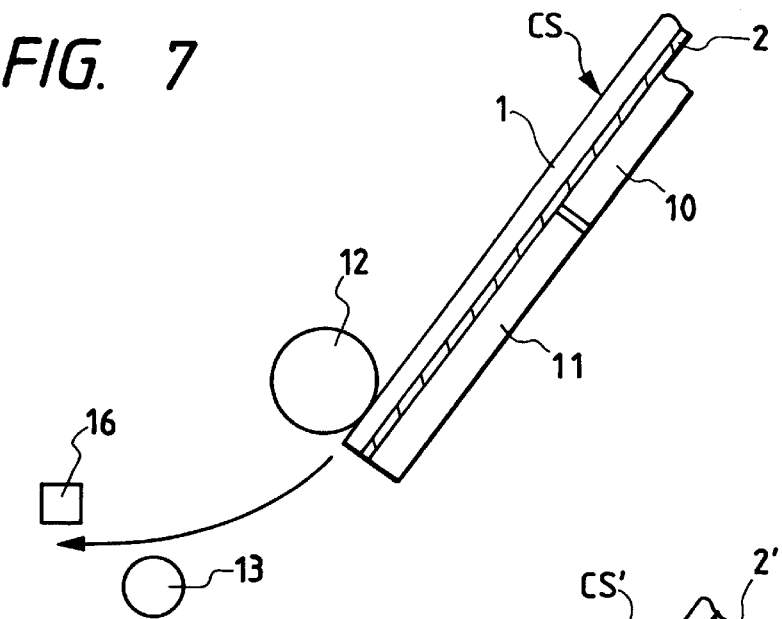
FIG. 7 is an explanatory view of the operation of a cleaning sheet according to the invention.

In such printer, for example, in order to clean the delivery roller 13 and paper discharge roller 17a, if the cleaning sheet according to the first embodiment is used, then the cleaning sheet CS is set in such a manner that the adhesive layer 2 thereof is opposed to the paper feed tray 10 and hopper 11, as shown in FIG. 7.

If the cleaning sheet CS is set in this manner, in a process where the cleaning sheet CS is supplied, when the hopper 11 pushes the cleaning sheet CS toward the feed roller 12, the adhesive layer 2 of the cleaning sheet CS is pressure held by and between the hopper 11 and feed roller 12. As a result of this, even if the feed roller 12 is rotated, a frictional force between the cleaning sheet CS and the hopper 11 and paper feed tray 12, especially a frictional force between the cleaning sheet CS and hopper 11 in the above-mentioned pressure holding portion increases to thereby make it impossible to supply the cleaning sheet CS.

Figure 8:
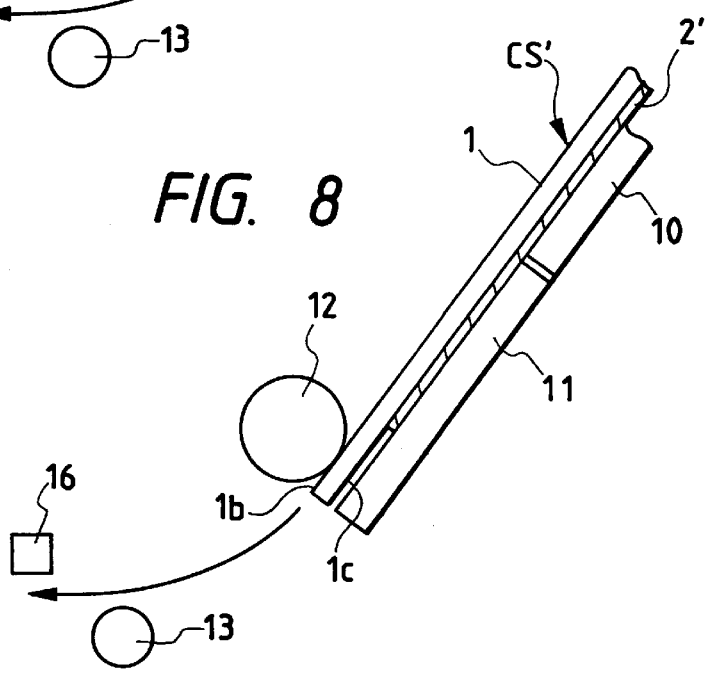
FIG. 8 is an explanatory view of the operation of another cleaning sheet according to the invention.
Figure 9:
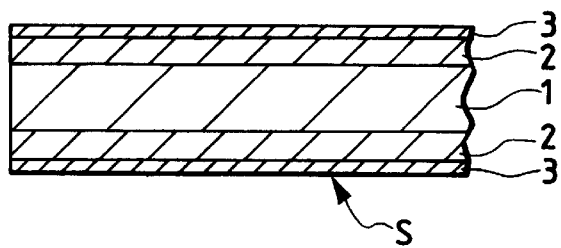
FIG. 9 is an explanatory view of the operation of a conventional cleaning sheet.

On the other hand, with use of the cleaning sheet CS' according to the third embodiment, as shown in FIG. 8, since the adhesive layer is not formed in the lower surface portion 1c of the cleaning sheet CS' opposed to the upper surface portion 1b to be in contact with the feed roller 12 when the cleaning sheet CS' is set in the paper feed tray 10 instead of the recording medium, a frictional force between the cleaning sheet CS' and the hopper 11 and paper feed tray 12 while the feed roller 12 is in operation, especially a frictional force between the cleaning sheet CS' and hopper 11 in the above-mentioned pressure holding portion is decreased to thereby make it possible to supply the cleaning sheet CS' positively.

In other words, in the cleaning sheet CS' according to the third embodiment, a friction relationship is always set such that $\mu1>\mu2$, where a friction coefficient between the feed roller 12 and cleaning sheet CS' is expressed as $\mu1$ and a friction coefficient between the cleaning sheet CS' and the hopper and paper feed tray is expressed as $\mu2$.

Also, the cleaning sheet CS' according to the third embodiment can also be used in a printer of a type shown in FIG. 5. In this case, the cleaning sheet CS' may be set in such a manner that the adhesive layer 2' faces up, preferably, the portion 1c of the cleaning sheet in which the adhesive layer is not formed may be positioned in the rear portion (in FIG. 5, in the left portion).

Further, an adhesive layer can be formed on the whole of the upper surface (in FIG. 3, the lower surface) of the sheet-shaped base member 1 as well.

4th Embodiment

Figure 4:
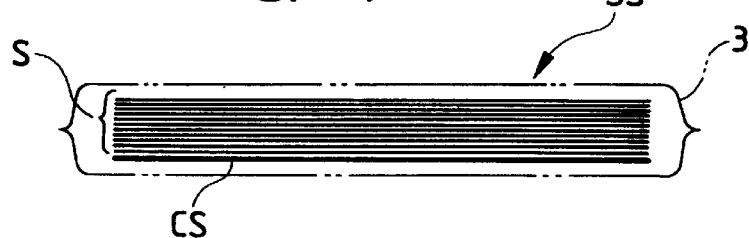
FIG. 4 is a schematic section view of an embodiment of a recording medium set according to the invention.

Now, FIG. 4 is a schematic section view of an embodiment of a recording medium set according to the invention.

As shown in FIG. 4, the present recording medium set SS includes the cleaning sheet CS (or CS', which will be used similarly in the following description) according to the above-mentioned first, second or third embodiment, a large number of recording mediums s superimposed on top of one another on the cleaning sheet CS, and a wrapping member 3.

As the recording medium S, not only ordinary paper but also the above-mentioned coated paper or the like can be enclosed and the number N1 of the recording mediums S to be enclosed is determined in the following manner:

That is, when images are formed on a preset number N2 of recording mediums S by the image forming apparatus, if it is assumed that the delivery performance of the image forming apparatus is degraded, then the number N1 of recording mediums to be enclosed is set smaller than the preset number N2.

For example, when the coated paper is enclosed as the recording medium S, as described before, if it is assumed that a non-feed condition occurs at the time when images are formed on about 7000 sheets of coated paper, the number N1 of sheets of coated paper to be enclosed is set much smaller than 7000 sheets, for example, it is set for 500 sheets.

Here, the number N1 of recording mediums to be enclosed may be determined properly according to the kinds of the recording mediums used (such as ordinary paper, coated paper, OHP sheet, calendered paper, bright film and the like).

As the wrapping member 3, there is used a wrapping member which is formed of polyethylene including a very slight slip agent content. If the slip agent content in the wrapping member is large, then the slip agent adheres to the recording medium S and cleaning sheet to thereby make it impossible to provide a good delivery condition.

According to the above-mentioned recording medium set, there can be obtained the following actions and effects:

That is, at the time when a user who has obtained the present recording medium set SS uses out the recording medium S of the recording medium set SS, the delivery performance of the image forming apparatus for delivering the recording medium S is not yet degraded.

On the other hand, if the recording medium S is used out, then the cleaning sheet CS is left and, therefore, it is easy for the user to use the cleaning sheet CS. In other words, at the time when the recording medium S of the recording medium set SS is used out, it can be expected sufficiently that the user is aware of the cleaning sheet CS left and thus uses the same.

Therefore, according to such recording medium set SS, it is possible to prevent the delivery performance of the image forming apparatus for delivering the recording medium S (at least such possibility can be expected sufficiently).

Although the typical embodiments of the invention have been described hereinbefore, the invention is not limited to these illustrated embodiments but can be changed and enforced properly within the scope of the subject matter of the invention.

For example, in the foregoing description of the above embodiments, the ink jet printer is employed as an image forming apparatus. However, this is not limitative but similar actions and effects can also be obtained even if, as the image forming apparatus, other types of printers (such as a wired dot printer, a thermal transfer printer, a laser printer and the like), a facsimile, a copying machine and the like are employed.

Also, even if the recording medium is a roll of sheet, similar actions and effects can be obtained.

According to a cleaning sheet as viewed from the first and second aspects of the invention, when the delivery performance of an image forming apparatus for delivering a recording medium is degraded, the degraded delivery performance of the image forming apparatus can be recovered effectively.

According to a cleaning sheet as viewed from the third aspect of the invention, even when an image forming apparatus is an apparatus of a type that it includes a feed roller which touches the upper surface of a recording medium set in a paper feed tray and supplies the recording medium due to its frictional force produced between them, the present cleaning sheet can be supplied into the image forming apparatus positively and also the degraded delivery performance of the image forming apparatus can be recovered, According to a cleaning sheet as viewed from the fourth and fifth aspects of the invention, even when an image forming apparatus is an apparatus of a type that it includes a feed roller which touches the upper surface of a recording medium set in a paper feed tray and supplies the recording medium due to its frictional force produced between the recording medium and itself, the present cleaning sheet can be supplied into the image forming apparatus positively and also the degraded delivery performance of the image forming apparatus can be recovered.

According to a cleaning sheet as viewed from the sixth aspect of the invention, the cleaning sheet can be used without worrying about the front and back surfaces thereof when it is supplied. Also, when an image forming apparatus includes not only delivery means touchable with the surface of a recording medium but also delivery means touchable with the back surface of the recording medium, the delivery performance of the two delivery means can be recovered at the same time.

According to the invention as viewed from the seventh aspect of the invention, it is possible to prevent the surface of the adhesive layer of the present cleaning sheet from being contaminated with dust and the like to thereby prevent the adhesive strength of the adhesive layer from being impaired. Therefore, the present cleaning sheet can be reused.

And, according to a recording medium set as viewed from the eighth aspect of the invention, it is possible to prevent the delivery performance of an image forming apparatus for delivering a recording medium from being degraded.

What is claimed is:

1. A cleaning system for an ink jet recording apparatus, comprising:

a cleaning sheet comprising:
a base sheet; and
an adhesive layer formed on at least one surface of said base sheet, said adhesive layer having a tackiness degree in the range of 1–5 according to a J DOW method provided by JIS Z-0237, said adhesive layer comprising a water-soluble polymeric material;

said adhesive layer of said cleaning sheet being adapted to remove gap agent and lubricant adhered to a rubber feed roller of said ink jet recording apparatus.

2. A cleaning system as set forth in claim 1, wherein said adhesive layer of said cleaning sheet is formed on both surfaces of said base sheet.

3. A cleaning system as set forth in claim 1, wherein said cleaning sheet further includes a protection sheet for covering the surface of said adhesive layer when said cleaning sheet is not in use.

4. The cleaning system as set forth in claim 3, wherein the quantity of the coating of said protection sheet is in a range of 0.1–3 $g/m^2$.

5. The cleaning system as set forth in claim 1, wherein said water-soluble polymeric material is at least one member selected from the group consisting of polyvinyl alcohol, polyvinylpyrrolidone, carboxymethyl cellulose, oxidized starch, polyacrylate, polymethacrylate, etherified starch, gelatin and its derivative, hydroxyethyl cellulose, albumin, starch, and silicone rubber.

6. The cleaning system as set forth in claim 1, wherein:

said adhesive layer of said cleaning sheet comprises a copolymer including a main monomer component, a comonomer component, and a functional group-containing monomer component;

said main monomer component is selected from ethyl acrylate, butyl acrylate, amyl acrylate, 2-ethylhexyl acrylate, octyl acrylate, cyclohexyl acrylate, benzyl acrylate, butyl methacrylate, 2-ethylhexyl methacrylate, cylcohexyl methacrylate, and benzyl methacrylate;

said comonomer component is selected from methyl acrylate, methyl methacrylate, ethyl methacrylate, vinyl acetate, and styrene acrylonitrile; and said functional group-containing monomer component is selected from acrylic acid, methacrylic acid, maleic acid, itaconic acid, crotonic acid, 2-hydroxyethyl (meth)acrylate, 2-hydroxypropyl (meth)acrylate, N-methylol acrylamide, acrylamide methacrylamide, and glycidyl methacrylate.

7. The cleaning system as set forth in claim 1, wherein the dry weight of the coating of said adhesive layer of said cleaning sheet is in a range of 5–50 $g/m^2$.

8. The cleaning system as set forth in claim 7, wherein the dry weight of the coating of said adhesive layer of said cleaning sheet is in a range of 10–30 $g/m^2$.

9. A cleaning method for an ink jet image forming apparatus that has a first feed roller which contacts with a recording medium to supply the recording medium by the frictional force between a first feed roller and the recording medium and that also has a rubber feed roller along a paper feed path, said method comprising:

providing a cleaning sheet comprising a base sheet having a lower surface and an upper surface, and an adhesive layer formed on at least one surface of said base sheet, said adhesive layer comprising a water-soluble polymeric material, wherein said adhesive layer is not formed in the portion of the cleaning sheet opposed to the portion of one of the lower and upper surfaces of said base sheet that contacts with the first feed roller, and wherein said adhesive layer of said cleaning sheet has a tackiness degree in the range of 1–5 according to a J DOW method provided by JIS Z-0237;

supplying said cleaning sheet to the ink jet image forming apparatus instead of the recording medium;

moving the cleaning sheet supplied to the ink jet image forming apparatus along the paper feed path in contact the rubber feed roller; and removing from the rubber feed roller adhered gap agent and adhered lubricant with the cleaning sheet.

10. The cleaning method as set forth in claim 9, wherein said step of providing a cleaning sheet includes providing said adhesive layer on both surfaces of said base sheet.

11. The cleaning method as set forth in claim 9, wherein said step of providing said cleaning sheet further includes providing a coated protection sheet for covering the surface of said adhesive layer when said cleaning sheet is not in use.

12. The cleaning method as set forth in claim 11, wherein the quantity of the coating of said protection sheet is in a range of 0.1–3 $g/m^2$.

13. The cleaning method as set forth in claim 9, further comprising:

determining a number, of images formed on recording mediums, at which delivery performance of the image forming apparatus is degraded; and providing a recording medium set including a plurality of recording mediums, superimposed on the cleaning sheet, in a quantity fewer than the number of recording mediums determined in said determining step.

14. The cleaning method as set forth in claim 9, wherein the dry weight of the coating of said adhesive layer of said cleaning sheet is in a range of 5–50 $g/m^2$.

15. The cleaning method as set forth in claim 14, wherein the dry weight of the coating of said adhesive layer of said cleaning sheet is in a range of 10–30 $g/m^2$.

* * * * *